(12) United States Patent
Takahata (10) Patent No.: US 9,705,126 B2
(45) Date of Patent: Jul. 11, 2017

(54) BATTERY ELECTRODE AND USE THEREOF

(75) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 971 days.

(21) Appl. No.: 13/880,395

(22) PCT Filed: Oct. 21, 2010

(86) PCT No.: PCT/JP2010/068585
§ 371 (c)(1),
(2), (4) Date: Apr. 19, 2013

(87) PCT Pub. No.: WO2012/053087
PCT Pub. Date: Apr. 26, 2012

(65) Prior Publication Data
US 2013/0209889 A1    Aug. 15, 2013

(51) Int. Cl.
*H01M 4/13* (2010.01)
*H01M 4/58* (2010.01)
(Continued)

(52) U.S. Cl.
CPC ............ *H01M 4/131* (2013.01); *H01G 11/28* (2013.01); *H01M 4/1391* (2013.01);
(Continued)

(58) Field of Classification Search
CPC ...... H01M 4/362; H01M 4/363; H01M 4/364; H01M 4/365; H01M 4/366; H01M 4/64; H01M 4/66; H01M 4/663; H01M 4/665; H01M 4/666; H01M 4/667; H01M 4/668; C04B 2235/5472
See application file for complete search history.

(56) References Cited

U.S. PATENT DOCUMENTS

| | | | |
|---|---|---|---|
| 2004/0121234 A1 | 6/2004 | Le | |
| 2010/0285369 A1* | 11/2010 | Takahata | H01M 4/13 429/231.95 |
| 2010/0297497 A1* | 11/2010 | Takahata | H01M 4/64 429/209 |

FOREIGN PATENT DOCUMENTS

| | | |
|---|---|---|
| JP | 2000-164206 | 6/2000 |
| JP | 2003-157852 | 5/2003 |

(Continued)

*Primary Examiner* — Eli Mekhlin
(74) *Attorney, Agent, or Firm* — Finnegan, Henderson, Farabow, Garrett & Dunner, LLP (57) ABSTRACT

An objective is to reduce the sheet resistance and gas evolution in a battery electrode comprising a conductive intermediate layer capable of reducing or shutting off a current when overcharged. A battery electrode (12) comprises a conductive intermediate layer (123) being placed between a current collector (122) and an active layer (124) while comprising conductive particles (50) and a binder (60). The mass proportion of conductive particles (50) is equal to or larger than the mass proportion of the binder (60). Conductive particles (50) has a size distribution that exhibits a first peak with the maximum at a first particle diameter value and a second peak with the maximum at a second particle diameter value larger than the first particle diameter value. The intermediate layer (123) contains 10% to 60% by mass of conductive particles (52) having particle diameters that belong to the second peak.

19 Claims, 6 Drawing Sheets

(51) Int. Cl.
*H01M 4/131* (2010.01)
*H01G 11/28* (2013.01)
*H01M 4/1391* (2010.01)
*H01M 4/66* (2006.01)

(52) U.S. Cl.
CPC ........... *H01M 4/663* (2013.01); *H01M 4/667* (2013.01); *H01M 4/668* (2013.01); *Y02E 60/13* (2013.01); *Y10T 29/49115* (2015.01)

(56) References Cited

FOREIGN PATENT DOCUMENTS

| | | |
|---|---|---|
| JP | 2006-4739 | 1/2006 |
| JP | 2006-512742 | 4/2006 |
| JP | 2006-140115 | 6/2006 |
| JP | 2007123141 A * | 5/2007 |
| JP | 2009-170132 | 7/2009 |
| JP | WO 2009087917 A1 * | 7/2009 |
| JP | WO 2009093504 A1 * | 7/2009 |
| JP | 2009-176540 | 8/2009 |
| JP | 2010-3614 | 1/2010 |
| JP | 2010-109080 | 5/2010 |
| KR | 10-2010-0103850 | 9/2010 |

* cited by examiner

BATTERY ELECTRODE AND USE THEREOF

CROSS-REFERENCE TO RELATED APPLICATIONS

This application is a national phase application of International Application No. PCT/JP2010/068585, filed Oct. 21, 2010, the content of which is incorporated herein by reference.

TECHNICAL FIELD

The present invention relates to a battery electrode, a method for producing the battery electrode, and a non-aqueous electrolyte secondary battery comprising the battery electrode.

BACKGROUND ART

Non-aqueous electrolyte secondary batteries have become increasingly important as, for example, power supplies loaded on electrically-driven vehicles, or as power sources loaded on PCs, mobile phones and other electric products, etc. In particular, lightweight lithium-ion secondary batteries with high energy densities are expected to be preferably used as high-power power supplies to be loaded on vehicles. Technical literatures relating to non-aqueous electrolyte secondary batteries include Patent Documents 1 to 3.

A non-aqueous electrolyte secondary battery may be charged as needed; however, overcharging might elevate the temperature. Patent Document 1 teaches to place a conductive intermediate layer that turns highly resistive when overcharged between a positive current collector and an active material-containing layer (or an active material layer hereinafter) in a lithium-ion secondary battery. According to this lithium-ion secondary battery, when overcharged, the resistance of the conductive intermediate layer increases, thereby reducing or shutting off the electric current flow. Thus, further temperature elevation is stopped in the lithium-ion secondary battery.

CITATION LIST

Patent Literatures

[Patent Document 1] Japanese Patent Application Publication No. 2000-164206
[Patent Document 2] Japanese Patent Application Publication No. 2009-176540
[Patent Document 3] Japanese Patent Application Publication No. 2009-170132

SUMMARY OF INVENTION

Technical Problem

While the conductive intermediate layer comprises a conductive material and exhibits conductivity, it its somewhat resistive. Thus, the positive electrode having a conductive intermediate layer exhibits higher resistance (sheet resistance) as compared to a positive electrode without an conductive intermediate layer, that is, a positive electrode in which an active material layer is formed directly on a surface of a current collector. In order to reduce the resistance of the conductive intermediate layer, a conductive material with smaller particle diameters may be used. However, with a conductive material having smaller particle diameters, internal gas evolution is likely to occur in a non-aqueous electrolyte secondary battery (typically a sealed battery) comprising the said conductive material. This gas may result in reduction of the battery's performance and reliability.

One objective of the present invention is to reduce the sheet resistance and the gas evolution in a battery electrode comprising a conductive intermediate layer capable of reducing or shutting off an electric current flow when overcharged. Another objective of the present invention is to provide a production method capable of preferably producing such a battery electrode. Another objective of the present invention is to provide a non-aqueous electrolyte secondary battery comprising such a battery electrode.

Solution to Problem

The present invention provides a battery electrode comprising a metallic current collector, a conductive intermediate layer being formed on the current collector and comprising conductive particles as well as a binder, and an active material layer being formed on the intermediate layer and comprising an electrode active material. In the intermediate layer, the mass proportion of the conductive particles is equal to or larger than the mass proportion of the binder. The conductive particles contained in the intermediate layer have a size distribution that exhibits a first peak with the maximum at a first particle diameter value and a second peak with the maximum at a second particle diameter value, with the second particle diameter value being larger than the first particle diameter value. The intermediate layer contains 10% to 60% by mass of conductive particles having particle diameters that belong to the second peak.

In the battery electrode, when overcharged, the resistance of the intermediate layer increases, and the electric current flow will be reduced or shut off. Thus, overheating of the battery is stopped. In the intermediate layer, conductive particles (or a first conductive particle group hereinafter) having relatively small particle diameters and conductive particles (or a second conductive particle group hereinafter) having relatively large particle diameters are present at the same time. Thus, when compared to an intermediate layer where conductive particles having large particle diameters are present solely; the resistance is lower. When compared to an intermediate layer where conductive particles having small particle diameters are present solely, the gas evolution is less likely to occur. According to the battery electrode, the presence of the second conductive particle group in a suitable amount leads to reductions in the sheet resistance and the gas evolution.

In the present description, the term "battery" refers to a general electric storage device capable of discharging electric energy, and the scope of the term encompasses secondary batteries (including storage batteries such as lithium-ion batteries, metal lithium secondary batteries, nickel-hydrogen batteries, nickel-cadmium batteries, etc.; and electric storage elements such as electric double layer capacitors, etc.) as well as primary batteries.

In a preferable embodiment of the battery electrode disclosed herein, the second particle diameter value is twice the first particle diameter value or larger. This leads to sufficient reductions in the sheet resistance and the gas evolution.

In another preferable embodiment of the battery electrode disclosed herein, the conductive particles and the binder in the intermediate layer are present at a mass ratio of 98:2 to 50:50. This leads to sufficient reductions in the sheet resistance and the gas evolution, and the temperature elevation in the battery upon overcharging can be preferably stopped.

In another preferable embodiment of the battery electrode disclosed herein, the conductive particles are carbon particles. As such, the temperature elevation in the battery upon overcharging can be preferably stopped, and the sheet resistance and the gas evolution can be sufficiently reduced as well.

In another preferable embodiment of the battery electrode battery electrode disclosed herein, the electrode active material consists of a material (e.g., a lithium transition metal oxide) capable of reversely storing and releasing lithium ions. This can bring out the effects described above in the battery electrode used for a lithium-ion secondary batter. In another aspect, the present invention provides a lithium-ion secondary battery comprising such an electrode.

The present invention provides a method for producing a battery electrode. The production method comprises a step of preparing a conductive intermediate layer-forming composition (a composition for forming a conductive intermediate layer) by at least mixing a first conductive particle group having a first particle diameter value, a second conductive particle group having a second particle diameter value larger than the first particle diameter value, and a binder. The production method further comprises a step of forming a conductive intermediate layer by applying the composition to a surface of a metallic current collector and allowing it to dry. The production method further comprises a step of forming an active material layer on a surface of the intermediate layer. In the step of preparing the conductive intermediate layer-forming composition, the combined mass proportion of the first and the second conductive particle groups is larger than the mass proportion of the binder, with the mass proportion of the second conductive particle group being 10% to 60%.

The present invention provides a non-aqueous electrolyte secondary battery comprising a positive electrode, a negative electrode, a separator placed between the positive electrode and the negative electrode, and a non-aqueous electrolyte. This non-aqueous electrolyte secondary battery comprises the battery electrode as the positive electrode. The art disclosed herein can be preferably applied to a non-aqueous electrolyte secondary battery (e.g., a lithium-ion secondary battery) used as a vehicle-driving power supply. In another aspect the present invention provides a vehicle comprising such a non-aqueous electrolyte secondary battery (typically as a power supply to drive the vehicle).

In the present description, "secondary battery" refers to a general electric storage device capable of charging and discharging repetitively, and the scope of the term encompasses so-called storage batteries such as lithium-ion secondary batteries and the like as well as electric storage elements such as electric double layer capacitors and the like. "Non-aqueous electrolyte secondary battery" refers to a battery comprising a non-aqueous electrolyte (typically an electrolyte solution containing a supporting salt (supporting electrolyte) in a non-aqueous solvent).

DESCRIPTION OF EMBODIMENTS

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field.

Figure 1:
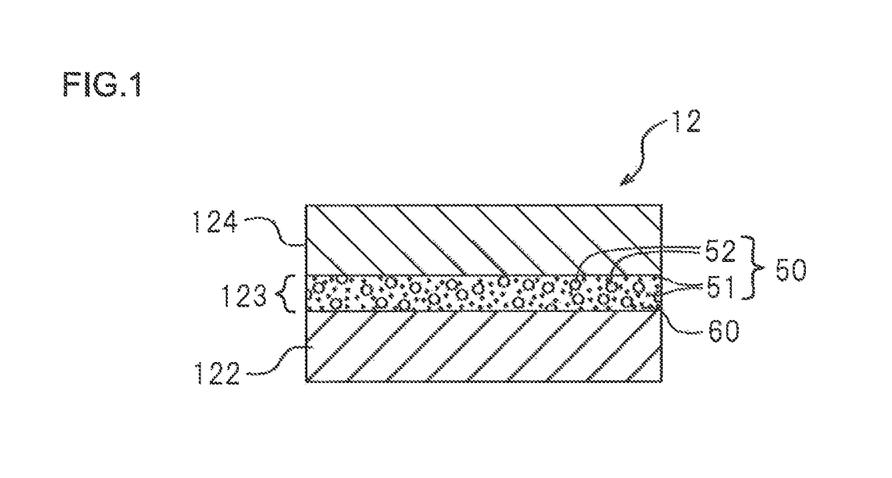
FIG. 1 shows a schematic cross-sectional view illustrating the constitution of a battery electrode according to an embodiment.

In the embodiment described below, the battery electrode according to the present invention is implemented as a positive electrode in a lithium-ion secondary battery as an example of a non-aqueous electrolyte secondary battery. However, the application of the present invention is not to be limited to such an electrode or a battery. As schematically shown in FIG. 1, positive electrode 12 comprises current collector 122, conductive intermediate layer 123 formed on top of current collector 122, and active material layer 124 formed on top of intermediate layer 123.

In general, as a current collector, can be used a material primarily comprising a highly conductive metal such as copper, nickel, aluminum, titanium, stainless steel, or the like. As current collector 122 of positive electrode 12 used in a lithium-ion secondary battery, can be preferably used aluminum, an alloy (an aluminum alloy) primarily comprising aluminum, or the like. Other examples include amphoteric metals such as zinc, tin, etc., and alloys primarily comprising one of these metals. The shape of current collector 122 is not particularly limited as it may vary depending on the shape, etc., of the lithium-ion secondary battery, and may have a variety of shapes such as a rod, plate, sheet, foil, mesh, and so on. In the present embodiment, current collector 122 made of an aluminum sheet is used. For example, an aluminum sheet having a thickness of about 10 µm to 30 µm can be preferably used.

Intermediate layer 123 comprises conductive particles 50 and binder 60. The mass proportion of conductive particles 50 is equal to or larger than the mass proportion of binder 60. Conductive particles 50 and binder 60 are present at a mass ratio of preferably 98:2 to 50:50, and typically 96:4 to 70:30. Intermediate layer 123 functions as a well-conductive body under normal charging and discharging conditions. However, in an overcharged state, it exhibits a higher resistance and functions to reduce or shut off the electric current flow. Although not to particularly limit the scope of the present invention, the present inventor considers that the resistance increases upon overcharging because of the following: Under normal usage, binder 60 is scattered over surfaces of conductive particles 50 while binding conductive particles 50 to each other. When the temperature is elevated with overcharging, however, binder 60 softens or melts down, and covers larger areas of the surfaces of conductive particles 50.

As conductive particles 50, for example, carbon powder can be preferably used. As conductive particles 50, conductive metal powder such as nickel powder or the like can be used as well. Among these, one species can be used solely, or two or more species can be used together. As the carbon powder, can be used carbon powder such as various carbon blacks (e.g., acetylene black, furnace black, Ketjen black), graphite powder and the like. Among these, acetylene black can be used particularly preferably. For example, can be used a particulate conductive material (e.g., a particulate carbon material such as acetylene black, etc.) of which constituent particles (typically primary particles) have an average particle diameter in a range of about 10 nm to 200 nm (e.g., about 20 nm to 100 nm).

Intermediate layer 123 comprises conductive particle groups having various average particle diameters. In typical, intermediate layer 123 comprises a first conductive particle group 51 having an average particle diameter of a first particle diameter value, and a second conductive particle group 52 having an average particle diameter of a second particle diameter value. Herein, the second particle diameter value is larger than the first particle diameter value. The second conductive particle group 52 accounts for 10% to 60% (typically greater than 10%, but less than 60%, preferably 14% or greater; but 59% or less) by mass in intermediate layer 123. The first conductive particle group 51 and the second conductive particle group 52 may consist of materials of the same kind. For example, each of the first conductive particle group 51 and the second conductive particle group 52 may consist of acetylene black; respectively. Alternatively, the first conductive particle group 51 and the second conductive particle group 52 may consist of different kinds of materials. For example, the first conductive particle group 51 and the second conductive particle group 52 may be acetylene black and Ketjen black in combination, acetylene black and a carbon fiber in combination, or the like. In typical, a combination of materials of the same kind with different average particle diameters, especially a combination of acetylene blacks, can be preferably used.

Figure 2:
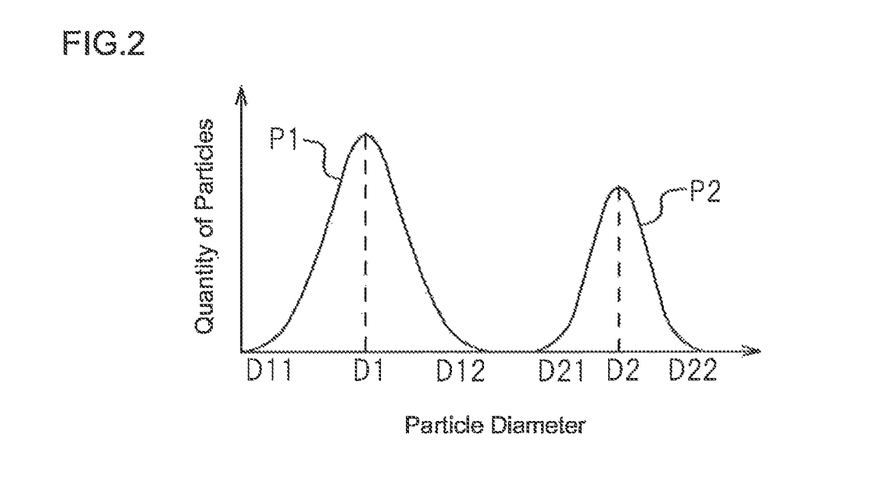
FIG. 2 shows a size distribution chart illustrating an exemplary size distribution of conductive particles contained in an intermediate layer.

Each of the first conductive particle group 51 and the second conductive particle group 52 may have a uniform diameter value (i.e., each may be monodisperse). In usual, however, conductive particle groups 51 and 52 having prescribed size distributions are used. Thus, the size distribution of conductive particles 50 in intermediate layer 123 typically appears bi-modal, having, for instance, as shown in FIG. 2, a first peak (first area of the size distribution) P1 with the maximum at a first particle diameter value D and a second peak (second area of the size distribution) P2 with the maximum at a second particle diameter value D2. When both groups are monodisperse, conductive particles having the first particle diameter value D1 and conductive particles having the second particle diameter value D2 are considered as the first conductive particle group 51 and the second conductive particle group 52, respectively. On the other hand, when the size distribution is bi-modal, conductive particles having particle diameters belonging to the first peak P1 are considered as the first conductive particle group 51 while conductive particles having particle diameters belonging to the second peak P2 are considered as the second conductive particle group 52.

Figure 3:
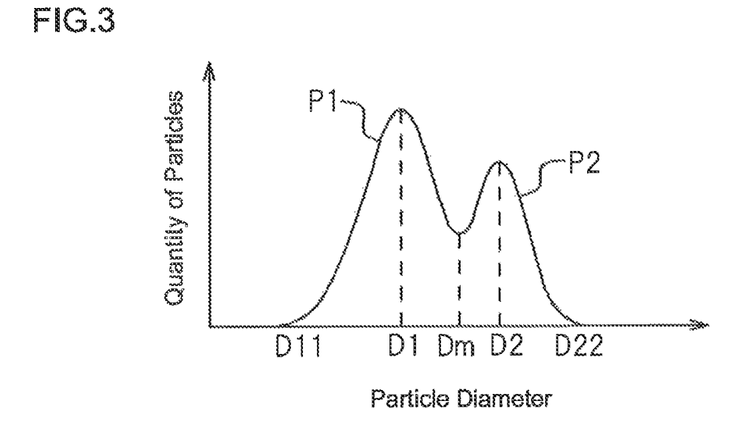
FIG. 3 shows a size distribution chart illustrating another exemplary size distribution of conductive particles contained in an intermediate layer.

In the example shown in FIG. 2, conductive particles having particle diameters of D11 to D12 are considered as the first conductive particle group 51, and conductive particles having particle diameters of D21 to D22 are considered as the second conductive particle group 52. Depending on the first particle diameter value D1 and the second particle diameter value D2, for instance, as shown in FIG. 3, there may be a case where the first peak P1 and the second peak P2 partially overlap. In such a case, particle diameter value Dm corresponding to the valley bottom of the size distribution may be considered as the border between the first peak P1 and the second peak P2. In other words, in the example shown in FIG. 3, conductive particles having particle diameters of D11 to Dm are considered as the first conductive particle group 51, and conductive particles having particle diameters of Dm to D22 are considered as the second conductive particle group 52.

Usually, the first particle diameter value D1 and the second particle diameter value D2 are the average particle diameters of the first conductive particle group 51 and the second conductive particle group 52, respectively. There are no particular limitations to the average particle diameters of the first conductive particle group 51 and the second conductive particle group 52 or to their relative proportions. The average particle diameter D1 of the first conductive particle group 51 is preferably in a range of about 10 nm to 200 nm (more preferably about 20 nm to 100 nm, e.g., about 20 nm to 50 mm). The ratio of the average particle diameter D2 of the second conductive particle group 52 relative to the average particle diameter D1 of the first conductive particle group 51, that is, D2/D1, is preferably about 1.2 or larger, more preferably about 1.5 or larger, or even more preferably about 2 or larger. When the D2/D1 ratio value is near 1, the effects obtainable by mixing two different conductive particle groups 51 and 52 having different particle diameters diminish, whereby reductions in both the sheet resistance and the gas evolution are less likely to be achieved at the same time. Although the upper limit of the D2/D1 value is not particularly limited, it is usually preferable to be 200 or smaller. For example, can be preferably used a second conductive particle group 52 that has an average particle diameter of 30 nm to 10 μm (more preferably 50 nm to 5 μm) and satisfies the D2/D1 value prescribed above.

The method for measuring the size distribution of conductive particles 50 is not particularly limited. For instance, the size distribution can be measured by measuring particle diameters of at least 50 particles or more, using photographs taken by an electron microscope such as a scanning electron microscope (SEM), a transmission electron microscope (TEM), or the like.

Although conductive particles 50 contained in intermediate layer 123 are typically formed of two different conductive particle groups, namely, the first conductive particle group 51 and the second conductive particle group 52, intermediate layer 123 may contain three different conductive particle groups having different average particle diameters. In this case, for instance, the mass proportion of the conductive particle group having the largest average particle diameter can be 10% to 60% (typically greater than 10%, but less than 60%, preferably 14% or greater, but 59% or less). The conductive particle groups having the smallest and the largest average particle diameters can be considered as the first and the second conductive particle groups, respectively.

As binder 60, various conventionally known materials can be used. For instance, can be used various types of thermoplastic resins including halogen-based resins such as polyvinylidene fluoride (PVDF), polyvinylidene chloride (PVDC), poly tetrafluoroethylene (PTFE), etc.; polyolefin-based resins such as polyethylene, polypropylene, etc.;

rubber-based elastomers such as styrene-butadiene rubber (SBR), fluoro-rubbers, etc.; acrylic resins; ethylene-vinyl acetate copolymers; and the like. As an example of a preferable binder in the present invention, PVDF can be cited since it is likely to form a conductive intermediate layer that exhibits a low resistance under normal usage while being likely to show a significantly higher resistance when overcharged.

Intermediate layer 123 can be formed typically by applying to a surface of current collector 122 a composition prepared by admixing the conductive particles 50 and binder 60 in a suitable solvent, and drying the composition. As the solvent constituting such a composition, in view of its combination with binder 60 to be used, can be suitably selected a solvent (which can be a solvent mixture) capable of dissolving or dispersing the binder. For example, when PVDF is used as binder 60, can be preferably used an organic solvent (a non-aqueous solvent) used for preparation of a conventional solvent-based paste mixture for forming active material layers. Examples of such an organic solvent include N-methyl-pyrrolidone (NMP), methyl ethyl ketone, toluene, and the like. Among these, for instance, NMP can be preferably used. Although not particularly limited, the solids content (the non-volatiles content, i.e., the ratio of the intermediate layer components; indicated as "NV" hereinafter) in the composition for forming intermediate layers may be, for instance, about 1 to 30% by mass (preferably about 5 to 20% by mass). When the NV is too high, the handling properties (e.g., the application ease, etc., when applying the composition to a current collector (especially, to a current collector foil)) of the intermediate layer-forming composition may tend to decrease. When the NV is too low, since a larger amount of an organic solvent is used, the cost tends to turn out higher.

As the positive electrode active material in active material layer 124, a material capable of storing and releasing lithium is used. Among substances conventionally used in lithium-ion secondary batteries, one species, or two or more species can be used without particular limitations. As the positive electrode active material, a lithium transition metal oxide (typically as particulates) is preferably used. In typical, can be used a suitably selected oxide having a layered structure or a spinel structure. For example, it is preferable to use one species, or two or more species selected from lithium-nickel-based composite oxides, lithium-cobalt-based composite oxides, and lithium-manganese-based composite oxides.

Herein, the scope of the lithium-nickel-based composite oxide encompasses, besides oxides containing lithium Li and nickel Ni as metal components, composite oxides that contain as metal components, in addition to Li and Ni, one, two or more other metals (i.e., a transition metal and/or a main group metal other than Li and Ni) in a proportion approximately equal to or smaller than Ni (based on the number of atoms; when two or more metals are contained other than Li and Ni, each metal being in a smaller proportion than Ni). Such metal can be, for instance, one, two or more elements selected from Co, Al, Mn, Cr, Fe, V, Mg, Ti, Zr, Nb, Mo, W, Cu, Zn, Ga, In, Sn, La and Ce. The same applies also to the scopes of the lithium-cobalt-based composite oxide and the lithium-manganese-based composite oxide. In a preferable embodiment of the art disclosed herein, as the positive electrode active material, is used a lithium transition metal composite oxide containing at least Ni, Co and Mn as metal components. For example, can be preferably used a lithium transition metal composite oxide comprising the three elements, Ni, Co and Mn, approximately in the same proportions based on the number of atoms.

As such a lithium transition metal oxide (typically as particulates), can be used as is, for instance, a lithium transition metal oxide powder (which may be referred to as an active material power hereinafter) prepared and provided by a conventional method heretofore known. For example, a lithium transition metal powder essentially consisting of secondary particles having an average particle diameter in a range of about 1 μm to 25 μm (typically about 2 μm to 15 μm) can be preferably used as the positive electrode active material in the art disclosed herein.

Other examples of a positive electrode active material usable in the art disclosed herein include so-called polyanion-based positive electrode active materials such as lithium iron phosphate, lithium nickel phosphate, lithium cobalt phosphate, lithium manganese phosphate, lithium iron silicate and the like.

The positive electrode active material layer in the art disclosed herein can be produced by applying a composition for forming a positive electrode active material layer (a positive electrode active material layer-forming composition) to a current collector provided with the intermediate layer, followed by drying the composition, with the composition being a dispersion of an active material as described above in a suitable liquid medium (a dispersion medium for the positive electrode active material). As the solvent contained in the liquid medium, any aqueous solvent and non-aqueous solvent can be used. As a non-aqueous solvent, for instance, NMP can be used preferably.

The composition typically comprises, in addition to a positive electrode active material and a solvent, etc., a conductive material to increase the conductivity of the positive electrode active material layer formed from the composition. As such a conductive material, can be preferably used, for example, a carbon material such as carbon powder, carbon fibers, and the like. Alternatively; a conductive metal powder such as nickel powder, etc., or a similar material may be used. Among these, one species can be used solely, or two or more species can be used together. As the carbon powder, can be used carbon powders such as various carbon blacks (e.g., acetylene black, furnace black, Ketjen black), graphite powder, and the like. Among these, acetylene black can be used preferably. For instance, it is preferable to use a particulate conductive material (e.g., a particulate carbon material such as acetylene black, etc.) constituted with particles (typically primary particles) having an average particle diameter in a range of about 10 nm to 200 nm (e.g., about 20 nm to 100 nm).

The composition can contain, as needed, one, two or more kinds of materials that can be added to a positive electrode active material composition in production of general lithium-ion battery positive electrodes. Examples of such materials include various polymer materials that can function as binders for positive electrode active materials. Examples of such a polymer material include the various materials listed earlier as binders that can be used in the intermediate layer as well as carboxymethylcellulose (CMC), polyvinyl alcohol (PVA) and the like. Among these polymer materials, one species can be used solely, or two or more species can be used together.

The positive electrode active material content in positive electrode active material layer 124 (which is, in typical, approximately equal to the proportion of the positive electrode active material in the solid components of the positive electrode active material composition) is preferably about 50% by mass or larger (typically 50 to 95% by mass), or more preferably about 75 to 90% by mass. In positive electrode active material layer 124 having a composition containing a conductive material, the conductive material content in the active material layer 124 can be about 3 to 25% by mass, or preferably about 3 to 15% by mass. In this case, the positive electrode active material content in the active material layer 124 is suitably about 80 to 95% by mass (e.g., 85 to 95% by mass).

When using a carbon material as the conductive material for production of an electrode, it is preferable to select a carbon material (e.g., acetylene black) with a low volatile content. A low volatile content in a carbon material could be linked to low presence of functional groups on surfaces of the carbon material. A carbon material with low presence of surface functional groups is preferable because, for instance, when a battery constituted with the carbon material is conditioned by a conventional method, it is less likely to evolve a gas upon its contacts with an electrolyte (typically a liquid) (as a result, the volume of the gas evolved by the conditioning process tends to be small). For example, a preferable carbon material has a volatile content of about 1% or less (typically about 0.1% to 1%) when measured based on JIS K6221.

Figure 4:
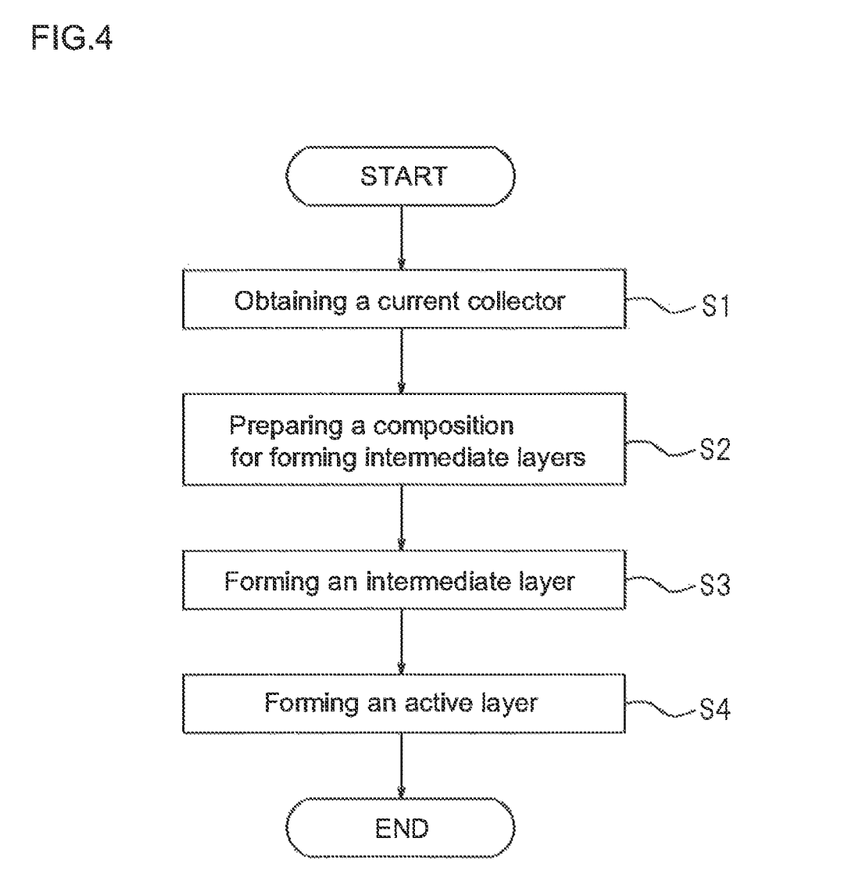
FIG. 4 shows a flow chart of a production method of the battery electrode according to an embodiment.

While referencing to the flow chart shown in FIG. 4, an embodiment of the electrode production method is described next. First of all, in step S1, a current collector is obtained. Subsequently, in step S2, a composition is prepared for forming an intermediate layer. For example, by mixing conductive particles (comprising a first and a second conductive particle groups), a binder and a solvent, a paste composition is prepared. Here, the combined mass proportion of the first and the second conductive particle groups should be greater than the mass proportion of the binder, with the mass proportion of the second conductive particle group being 10% to 60% (preferably 14% to 59%).

Although not particularly limited, in a preferable embodiment, for the preparation of the composition, a second conductive particle group and a binder are mixed with a solvent first, and then, to the mixture, a first conductive particle group is admixed and dispersed. Such an embodiment is suitable when the intermediate layer composition is prepared as a uniform dispersion of the first conductive particle group having a relatively small average particle diameter (thereby being less likely to form a uniform dispersion). The first conductive particle group can be added all in a single portion, in divided portions, or gradually (continuously). For example, it is preferable to divide the total amount of the first conductive particle group to be used into 2 to 50 (more preferably 3 to 20, e.g., 5 to 10) portions (typically in equal amounts), and add these at a prescribed time interval (e.g., at about a 3 to 10 rain interval). With respect to the binder and the second conductive particle group, either can be mixed first with a solvent, or the two can be mixed in the solvent at about the same time.

Subsequently, in step S3, by applying the composition to a surface (one or each surface) of a current collector and allowing the composition to dry, an intermediate layer is formed on the current collector. Application of the intermediate layer-forming composition to the current collector surface can be preferably carried out by a suitable conventional application device heretofore known (a slit coater, die coater, comma coater, gravure coater, etc.). After applied, by drying the applied composition (with use of a suitable drying means (a heater, etc.) as needed), an intermediate layer is formed. The amount of the intermediate layer-forming composition applied is not particularly limited. However, when the applied amount is too small, it may be difficult to obtain the effects to reduce or shut off an electric current flow when overcharged. When the applied amount is too large, the sheet resistance may tend to become higher. The applied amount can be usually about 0.1 $g/m^2$ to 10 $g/m^2$ (based on the solids content) per face of the current collector. For instance, it is preferably about 1 $g/m^2$ to 5 $g/m^2$ (based on the solids content).

Subsequently, in step S4, an active material layer is formed on the surface of the intermediate layer. In particular, a composition containing an active material, a conductive material and a binder is prepared for forming an active material layer, and the composition is applied on top of the intermediate layer and allowed to dry.

After this, by pressing the entire body as necessary or cutting it into a desirable size, an electrode having target thickness and size is obtained.

The electrode provided by the present invention can be preferably used as an electrode (e.g., a positive electrode) for fabricating a battery of various forms. For example, it is suitable as a component in a lithium-ion battery comprising a positive electrode formed with the above-mentioned electrode, a negative electrode having a negative electrode active material layer retained on a negative current collector, an electrolyte placed between the positive and the negative electrodes, and typically a separator (which may be unnecessary when the electrolyte is a solid) to isolate the positive and the negative current collectors. There are not particular limitations to the construction (e.g., a metallic case or a laminated film construction) and the size of a container or to the structure (e.g., a wound structure or a layered structure), etc., of the electrode body primarily comprising the positive and the negative current collectors.

Figure 5:
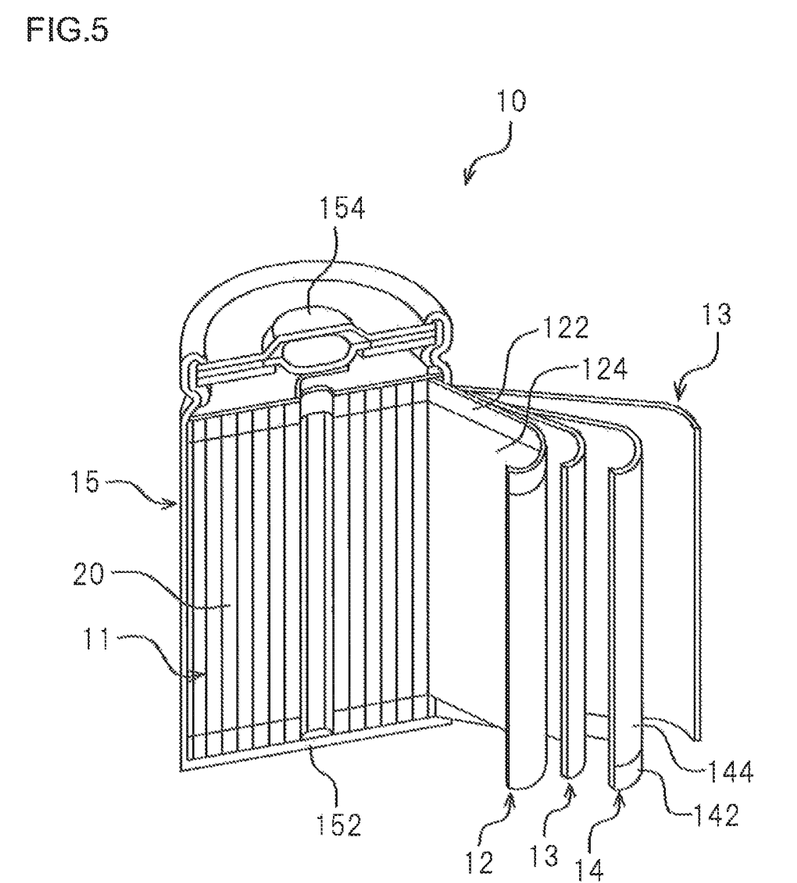
FIG. 5 shows a schematic perspective partial cutaway view illustrating a lithium-ion secondary battery according to an embodiment.

FIG. 5 shows lithium-ion secondary battery 10 as an example of a non-aqueous electrolyte secondary battery comprising the electrode provided by the present invention as the positive electrode. Lithium-ion secondary battery 10 has a constitution in which electrode body 11 is contained along with non-aqueous electrolyte 20 in battery case 15. At least part of non-aqueous electrolyte 20 is integrated in electrode body 11. Electrode body 11 comprises positive electrode 12, negative electrode 14 and separators 13.

Positive electrode 12 is constituted with an electrode provided by the present invention. Positive electrode 12 comprises a long sheet of positive current collector 122, positive electrode active material layer 124 comprising a positive electrode active material and being provided on top of positive electrode current collector 122. Between positive current collector 122 and positive electrode active material layer 124, a conductive intermediate layer is formed. Negative electrode 14 comprises a long sheet of negative current collector 142 and negative electrode active material layer 144 comprising a negative electrode active material and being provided on negative current collector 142. Separator 13 is formed as a long sheet, similarly to positive electrode 12 and negative electrode 14. Positive electrode 12 and negative electrode 14 are wound in a roll along with two sheets of separator 13, with each separator 13 being present between the two electrodes. Electrode body 11 is thus formed.

Battery case 15 comprises bottomed cylindrical case body 152 and cover 154 to close the opening thereof. Both cover 154 and case body 152 are made of metal, and they are insulated from each other. Cover 154 is electrically connected to positive current collector 122, and case body 152 is electrically connected to negative current collector 142. In this lithium-ion secondary battery 10, cover 154 and case body 152 function also as a positive terminal and a negative terminal, respectively.

Positive current collector 122 has a region at an edge (the upper edge in FIG. 1) along the length direction where positive current collector 122 is exposed with no presence of positive electrode active material layer 124. To the exposed region, cover 154 is electrically connected. Negative current collector 142 has a region at an edge (the lower edge in FIG. 1) along the length direction where negative current collector 142 is exposed with no presence of negative electrode active material layer 144. To this exposed region, case body 152 is electronically connected.

The non-electrolyte contains a lithium salt as a supporting salt in an organic solvent (non-aqueous solvent). A preferable non-aqueous electrolyte (i.e., an electrolyte solution) is present as a liquid at room temperature. As the lithium salt, for instance, can be suitably selected and used a heretofore known lithium salt conventionally used as a supporting salt of a non-aqueous electrolyte in a lithium-ion secondary battery Examples of such a lithium salt include $LiPF_6$, $LiBF_4$, $LiClO_4$, $LiAsF_6$, $Li(CF_3SO_2)_2N$, $LiCF_3SO_3$ and the like. Among such supporting salts, can be used one species solely, or two or more species in combination. An especially preferable example is $LiPF_6$. It is preferable to prepare the non-aqueous electrolyte to have a supporting salt concentration within a range of, for instance, 0.7 mol/L to 1.6 mmol/L.

As the non-aqueous solvent, can be suitably selected and used an organic solvent used in a typical lithium-ion secondary battery. Examples of a particularly preferable non-aqueous solvent include carbonates such as ethylene carbonate (EC), dimethyl carbonate (DMC), ethyl methyl carbonate (EMC), diethyl carbonate (DEC), propylene carbonate (PC), and the like. Among these organic solvents, can be used one species solely, or two or more species in combination.

As negative current collector 142, can be preferably used a conductive material formed of a metal having good conductivity. For instance, copper or an alloy containing copper as the primary component can be used. The shape of the negative current collector 142 is not particularly limited as it may vary in accordance with the shape, etc., of the lithium-ion secondary battery, and it may have a variety of shapes such as a rod, plate, sheet, f, foil, mesh, and so on. In the present embodiment, a copper sheet is used as negative current collector 142. A copper sheet having a thickness of about 5 μm to 30 μm can be preferably used.

Negative electrode active material layer 144 comprises, in addition to a negative electrode active material, a conductive material, similarly to positive electrode active material layer 124, as well as a binder, etc., as needed. Although not particularly limited, a binder can be used in an amount of, for instance, 0.5 to 10 parts by mass relative to 100 parts by mass of the negative electrode active material. Similarly to positive electrode active material layer 124, the negative electrode active material layer 144 can be preferably fabricated by preparing a composition as a dispersion of a negative electrode active material in a liquid medium containing a suitable solvent and a binder, applying the composition to negative current collector 142 followed by allowing the applied composition to dry, and pressing the resultant if desired.

As the negative electrode active material, can be used one, two or more species among the substances conventionally used in lithium-ion secondary batteries without particular limitations. Examples of a preferable negative electrode active material include carbon particles. A preferable particulate carbon material (carbon particles) contains a graphite structure (layered structure) at least partially. Any carbon material among so-called graphitic substances (graphites), hard-to-graphitize carbonaceous substances (hard carbons), easy-to-graphitize carbonaceous substances (soft carbons) and substances having a structure combining these can be preferably used.

Separator 13 is formed as a long sheet. However, the shape of separator 13 may be varied according to the shape, etc., of the lithium-ion secondary battery, and thus is not particularly limited to a sheet form. As separator 13, for instance, can be preferably used a porous film made of an polyolefin-based resin such as polyethylene, polypropylene, or the like.

Figure 6:
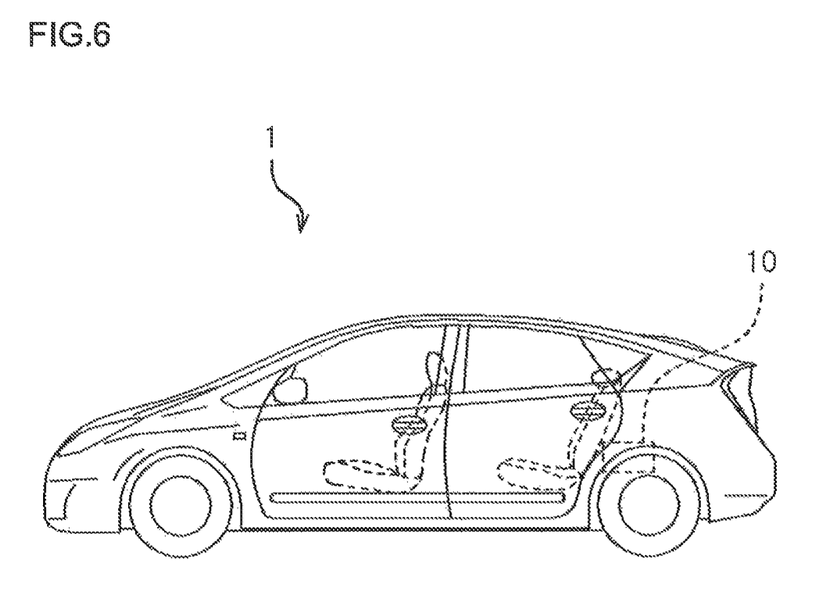
FIG. 6 shows a schematic side view illustrating a vehicle (automobile) comprising a lithium-ion secondary battery according to an embodiment.

Lithium-ion secondary battery 10 according to the present embodiment can be used as a lithium-ion secondary battery for various intended purposes. For example, as shown in FIG. 6, it can be preferably used as a power supply for a vehicle-driving motor (an electric motor) loaded on vehicle 1 such as an automobile, or the like. Although the type of vehicle 1 is not particularly limited, in typical, it is a hybrid automobile, an electric automobile, a fuel cell automobile, or the like. Such a lithium-ion secondary battery 10 can be used alone, or as in a battery system formed with several batteries connected linearly or in parallel.

EXAMPLES

Several worked examples relevant to the electrode according to the present invention are described below. The present invention, however, is not, of course, limited to the worked examples described below.

Example 1

Using an aluminum foil as the current collector, was fabricated an electrode sheet comprising as the positive electrode active material a lithium nickel cobalt manganese composite oxide having a composition represented by $LiNi_{1/3}Co_{1/3}Mn_{1/3}O_2$.

Conductive intermediate layers were formed as follows: That is to say, acetylene black (AB) having an average particle diameter of 35 nm was used as the first conductive particle group, acetylene black having an average particle diameter of 76 nm was used as the second conductive particle group, and PVDF was used as the binder. The first conductive particle group, the second conductive particle group and the binder at a mass ratio of 80:14:6 were mixed in NMP (solvent) to an NV of approximately 9% by mass to prepare a composition for forming intermediate layers. The mass ratio of the conductive particles to the binder is 94:6. This composition was applied to each face of a 15 μm thick long aluminum foil (current collector) and allowed to dry to form an intermediate layer on each face of the current collector. Here, the composition was applied using a gravure coater, and the applied amount (coating weight) was adjusted to be about 2 $g/m^2$ (based on the solids content) per face of the current collector. The numerical value of the coating weight ($g/m^2$) is approximately equal to that of the thickness (gin) of the intermediate layer formed after dried (i.e., the dried film thickness). It other words, with the said applied amount, an intermediate layer of about 2 μm thickness is formed.

Positive electrode active material layers were formed as follows: That is to say, the lithium nickel cobalt manganese composite oxide powder (positive electrode active material), acetylene black (conductive material) having an average particle diameter of 48 nm and CMC (binder) at a mass ratio of 85:10:5 were mixed in ion-exchanged water to an NV of approximately 45% by mass to prepare a composition for forming active material layers (active material layer-forming composition). By applying the active material layer-forming composition on top of intermediate layers and allowing the composition the composition to dry, active material layers were formed. The applied amounts (based on the solids content) of the active material layer-forming composition were adjusted to be approximately 12.8 mg/cm² for both faces combined. With the active material layer composition being in the dried state, the overall thickness including the current collector and the electrode films (intermediate layers and active material layers) formed on both faces thereof was approximately 80 μm. This was pressed to an overall thickness of 64 μm.

Example 2

In the same manner as Example 1 except that the mass ratio of the first conductive particle group to the second conductive particle group to the binder was 70:24:6 in the composition for forming intermediate layers, an electrode sheet was fabricated.

Example 3

In the same manner as Example 1 except that the mass ratio of the first conductive particle group to the second conductive particle group to the binder was 50:44:6 in the composition for forming intermediate layers, an electrode sheet was fabricated.

Example 4

In the same manner as Example 1 except that the mass ratio of the first conductive particle group to the second conductive particle group to the binder was 35:59:6 in the composition for forming intermediate layers, an electrode sheet was fabricated.

Comparative Example 1

In the same manner as Example 1 except that the mass ratio of the first conductive particle group to the second conductive particle group to the binder was 94:0:6 in the composition for forming intermediate layers, an electrode sheet of Comparative Example 1 was fabricated. That is, in Comparative Example 1, the conductive particles contained in the intermediate layers consist of the first conductive particle group with no second conductive particle group content.

Comparative Example 2

In the same manner as Example 1 except that the mass ratio of the first conductive particle group to the second conductive particle group to the binder was 20:74:6 in the composition for forming intermediate layers, an electrode sheet of Comparative Example 2 was fabricated.

<Measurement of Sheet Resistance>

Two sheets each of the respective electrodes of Examples and Comparative Examples were overlaid, and pressure of 2500 N was applied thereto. While keeping them in this state, the sheet resistance (Ω/cm²) was measured by a four-terminal four-point probe method based on JIS K7194. The results of the measurements are shown in Table 1.

<Measurement of High Temperature Sheet Resistance>

As described earlier, the intermediate layer functions to reduce or shut off the electric current flow at a high temperature. Thus, to evaluate this function of the intermediate layer, after the respective electrode sheets of Examples and Comparative Examples were left at 180° C. for 10 seconds, the sheet resistance (or referred to as the high temperature sheet resistance hereinafter) was measured. The measurement method is the same as the sheet resistance measurement described above. The results of the measurements are shown in Table 1.

<Measurement of Volume of Gas Evolved>

Laminated cell batteries comprising the respective electrode sheets of Examples and Comparative Examples were fabricated, and the volumes of gases formed were measured, respectively.

As the negative electrode, the following was used: That is to say, natural graphite (powder), SBR and CMC at a mass ratio of 98:1:1 were mixed in ion-exchanged water to an NV of 45% by mass to prepare a composition for forming active material layers. By applying this composition to each face of a 15 μm thick long copper foil (negative electrode current collector) and allowing the composition to dry, negative electrode active material layers were material layers were formed. With the negative electrode active material layer composition being in the dried state, the overall thickness including the current collector and the negative electrode active material layers formed on both faced thereof was approximately 120 μm. This was pressed to an overall thickness of 85 μm. A sheet of negative electrode (or a negative electrode sheet, hereinafter) was fabricated.

The negative electrode sheet and the sheet of electrode (or the positive electrode sheet, hereinafter) according to each example were overlaid along with two long separator sheets (porous polyethylene sheets were used here). The overlaid sheets were wound in the length direction to fabricate a wound electrode body. The electrode body was placed in a laminated-film container along with a non-aqueous electrolyte to constitute a lithium-ion secondary battery having a capacity of about 500 mAh. As the non-aqueous electrolyte, was used an electrolyte solution having a composition in which a supporting salt ($LiPF_6$ here) was dissolved at a concentration of 1 mol/L, in a mixed solvent formed of EC and DEC at 3:7 (volume ratio).

The lithium-ion secondary battery thus constituted was subjected to a suitable conditioning process (e.g., an initial charge/discharge process that carries out two to three cycles of charging at a constant current rate of 1/10 C for three hours followed by charging at a constant current rate of 1/3 C up to 4.1 V and discharging at a constant current rate of 1/3 C down to 3.0 V). After this, the volume of a gas evolved was measured by the water displacement method. The results of the measurements are shown in Table 1

TABLE 1

| | 1st conductive particle group (AB ø35 nm) (parts) | 2nd conductive particle group (AB ø76 nm) (parts) | Binder (PVDF) (parts) | Sheet resistance (mΩ/cm$^2$) | High temperature sheet resistance (mΩ/cm$^2$) | Volume of gas evolved (ml) |
|---|---|---|---|---|---|---|
| Comp. Ex. 1 | 94 | 0 | 6 | 39.4 | 380 | 13.5 |
| Ex. 1 | 80 | 14 | 6 | 39.5 | 396 | 10 |
| Ex. 2 | 70 | 24 | 6 | 39.8 | 401 | 9.5 |
| Ex. 3 | 50 | 44 | 6 | 39.9 | 411 | 8.5 |
| Ex. 4 | 35 | 59 | 6 | 40 | 422 | 7.5 |
| Comp. Ex. 2 | 20 | 74 | 6 | 43.8 | 423 | 7 |

From Table 1, with respect to each of Examples 1 to 4 and Comparative Examples 1 to 2, it is evident that the high temperature sheet resistance is about 10 times the initial sheet resistance, and the resistance of the intermediate layer increases at a high temperature, whereby the intermediate layer functions to reduce or shut off the electric current.

From Table 1, it is also evident that Examples 1 to 4 and Comparative Example 2 comprising the first conductive particle group and the second conductive particle group evolve reduced volumes of gases as compared to Comparative Example 1 comprising no second conductive particle group It is also evident that as the proportion of the second conductive particle group having relatively large diameters increases, the volume of gas evolved becomes smaller.

On the other hand, from Table 1, it can be found that as the proportion of the second conductive particle group increases, the initial sheet resistance increases. However, it can be seen that unlike Comparative Example 2, Examples 1 to 4 have sheet resistance nearly comparative to that of Comparative Example 1 in which the conductive particles consist of the first conductive particle group alone.

Figure 7:
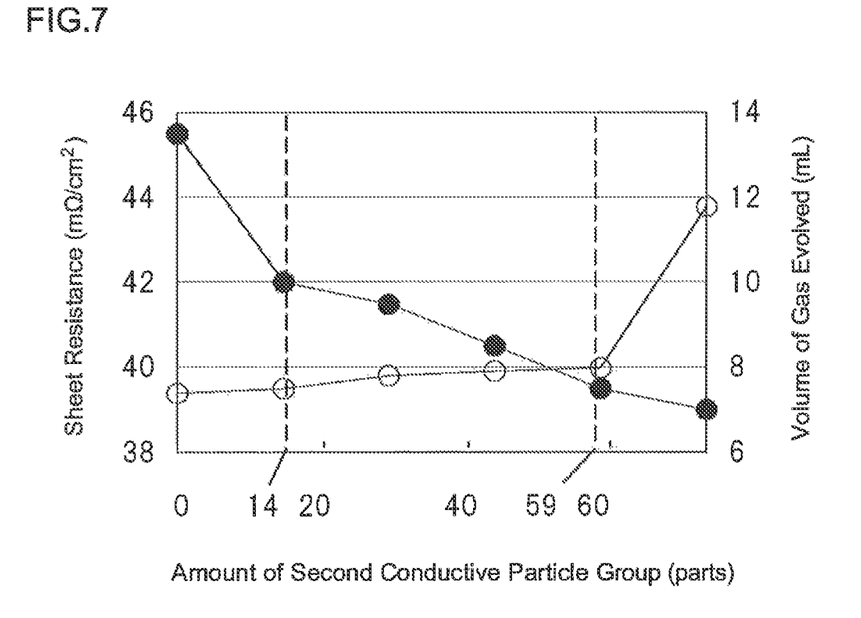
FIG. 7 shows a graph illustrating the relationships between the second conductive particle group content versus the sheet resistance and the volume of gas evolved.

Based on these results, as shown in FIG. 7, it can be seen that with the mass proportion of the second conductive particle group being in a range of 10% to 60%, the sheet resistance and the gas evolution can be both reduced. With the mass proportion of the second conductive particle group being in a range of 14 to 59% (14.9% to 62.8% when converted to the mass proportion of the second conductive particle group relative to all conductive particles), particularly good results were obtained. In the graph shown in FIG. 7, open circles indicate the sheet resistance, and solid circles indicate the volume of gas formed.

It is presumed that with respect to these Examples and Comparative Examples, although the mass ratio of all conductive particles to the binder was 94:6, even if the said mass ratio were somewhat varied, the effects to reduce the sheet resistance and the gas evolution would have been obtainable in the same manner. The mass ratio is preferable to be 98:2 to 50:50, or particularly preferable to be 96:4 to 70:30.

Although specific embodiments of the present invention have been described in detail above, these are merely for illustrations, and the invention disclosed herein includes various modifications and changes of the specific embodiments illustrated above.

REFERENCE SIGNS LIST 1 vehicle
10 lithium-ion secondary battery (non-aqueous electrolyte secondary battery)
12 positive electrode (battery electrode)
50 conductive particles
51 first conductive particle group
52 second conductive particle group
60 binder
122 current collector
123 intermediate layer
124 active material layer

The invention claimed is:

1. A positive electrode for a battery, comprising:
a metallic positive electrode current collector;
a conductive intermediate layer being formed on the positive electrode current collector and comprising conductive particles and a binder; and
a positive electrode active material layer being formed on the intermediate layer and comprising a positive electrode active material,
wherein
the intermediate layer is directly in contact with the positive electrode current collector and the positive electrode active material layer,
only a single layer of the intermediate layer is present between the positive electrode current collector and the positive electrode active material layer,
in the intermediate layer, the conductive particles and the binder are present at a mass ratio of 98:2 to 70:30,
the conductive particles contained in the intermediate layer has a size distribution that exhibits a first peak with the maximum at a first particle diameter value and a second peak with the maximum at a second particle diameter value, with the second particle diameter value being larger than the first diameter value,
the intermediate layer contains 10% to 60% by mass of second conductive particles having particle diameters that belong to the second peak, and
the first particle diameter value is 20 nm to 50 nm, the second particle diameter value is 30 nm to 5 μm, and the second particle diameter value is 1.5 times the first particle diameter value or larger.

2. The positive electrode according to claim 1, wherein the second particle diameter value is twice the first particle diameter value or larger.

3. The positive electrode according to claim 1, wherein the positive electrode active material comprises at least one lithium transition metal oxide.

4. A non-aqueous electrolyte secondary battery comprising: a positive electrode; a negative electrode; a separator placed between the positive electrode and the negative electrode; and a non-aqueous electrolyte, with the non-aqueous electrolyte secondary battery comprising, as the positive electrode, the positive electrode according to claim 1.

5. A vehicle-driving power supply comprising at least one non-aqueous electrolyte secondary battery according to claim 4.

6. The positive electrode according to claim 1, wherein the first particle diameter value is 20 nm to 35 nm, and the second particle diameter value is 30 nm to 76 nm.

7. The positive electrode according to claim 6, wherein both of first conductive particles having the first particle diameter value and second conductive particles having the second particle diameter value consist of acetylene black.

8. The positive electrode according to claim 7, wherein the positive electrode active material comprises at least one lithium transition metal oxide.

9. A lithium-ion secondary battery comprising the positive electrode according to claim 8.

10. The positive electrode according to claim 1, wherein both of first conductive particles having the first particle diameter value and second conductive particles having the second particle diameter value consist of acetylene black.

11. A lithium-ion secondary battery comprising the positive electrode according to claim 1.

12. The positive electrode according to claim 1, wherein the binder is polyvinylidene fluoride.

13. The positive electrode according to claim 1, wherein the positive electrode active material layer contains a conductive material consisting of an acetylene black having a volatile content measured based on JIS K6221 of 0.1% to 1%.

14. A method for producing a positive electrode of a battery comprising:
a step of preparing a composition for forming a conductive intermediate layer by at least mixing a first conductive particle group having a first particle diameter value, a second conductive particle group having a second particle diameter value, and a binder;
a step of forming a conductive intermediate layer by applying the composition for forming the conductive intermediate layer onto a surface of a metallic positive electrode current collector and allowing it to dry; and
a step of forming a positive electrode active material layer on a surface of the intermediate layer,
wherein
the intermediate layer is directly in contact with the positive electrode current collector and the positive electrode active material layer,
only a single layer of the intermediate layer is present between the positive electrode current collector and the positive electrode active material layer,
in the step of preparing the composition for forming the conductive intermediate layer, a mass ratio of the combined amount of the first and the second conductive particle groups to the binder is 98:2 to 70:30, with the mass proportion of the second conductive particle group being 10% to 60%, and
the first particle diameter value is 20 nm to 50 nm, the second particle diameter value is 30 nm to 5 μm, and the second particle diameter value is 1.5 times the first particle diameter value or larger.

15. The method according to claim 14, wherein the first particle diameter value is 20 nm to 35 nm, and the second particle diameter value is 30 nm to 76 nm.

16. The method according to claim 14, wherein both of the first conductive particle and the second conductive particle consist of acetylene black.

17. The method according to claim 14, wherein the positive electrode active material comprises at least one lithium transition metal oxide.

18. The method according to claim 14, wherein the composition for forming the conductive intermediate layer is formed by using an organic solvent and polyvinylidene fluoride as the binder.

19. A vehicle-driving power supply comprising at least one non-aqueous electrolyte secondary battery, comprising: a positive electrode; a negative electrode; a separator placed between the positive electrode and the negative electrode; and a non-aqueous electrolyte,
wherein the positive electrode comprises:
a metallic positive electrode current collector;
a conductive intermediate layer being formed on the positive electrode current collector and comprising conductive particles and a binder; and
a positive electrode active material layer being formed on the intermediate layer and comprising a positive electrode active material,
the intermediate later is directly in contact with the positive electrode current collector and the positive electrode active material layer,
only a single layer of the intermediate layer is present between the positive electrode current collector and the positive electrode active material layer,
the positive electrode active material comprises at least one lithium transition metal oxide,
the conductive particles and the binder are present at a mass ratio of 98:2 to 70:30 in the intermediate layer,
the conductive particles contained in the intermediate layer have a size distribution that exhibits a first peak with the maximum at a first particle diameter value and a second peak with the maximum at a second particle diameter value, with the second particle diameter value being larger than the first diameter value,
the intermediate layer contains 10% to 60% by mass of second conductive particles having particle diameters that belong to the second peak,
both of first conductive particles having the first particle diameter value and second conductive particles having the second particle diameter value consist of acetylene black,
the first particle diameter value is 20 nm to 50 nm, the second particle diameter value is 30 nm to 5 μm, and the second particle diameter value is twice the first particle diameter value or larger,
the binder is polyvinylidene fluoride, and
the positive electrode active material layer contains a conductive material consisting of an acetylene black having a volatile content measured based on JIS K6221 of 0.1% to 1%.

* * * * *